Feb. 1, 1966  L. E. PENNINGTON ETAL  3,232,637
PIPE COUPLING
Original Filed Feb. 23, 1961  2 Sheets-Sheet 1

INVENTORS
LOUIS E. PENNINGTON
LIP FOU WONG
BY
Glenn L. Jackson

THEIR ATTORNEYS

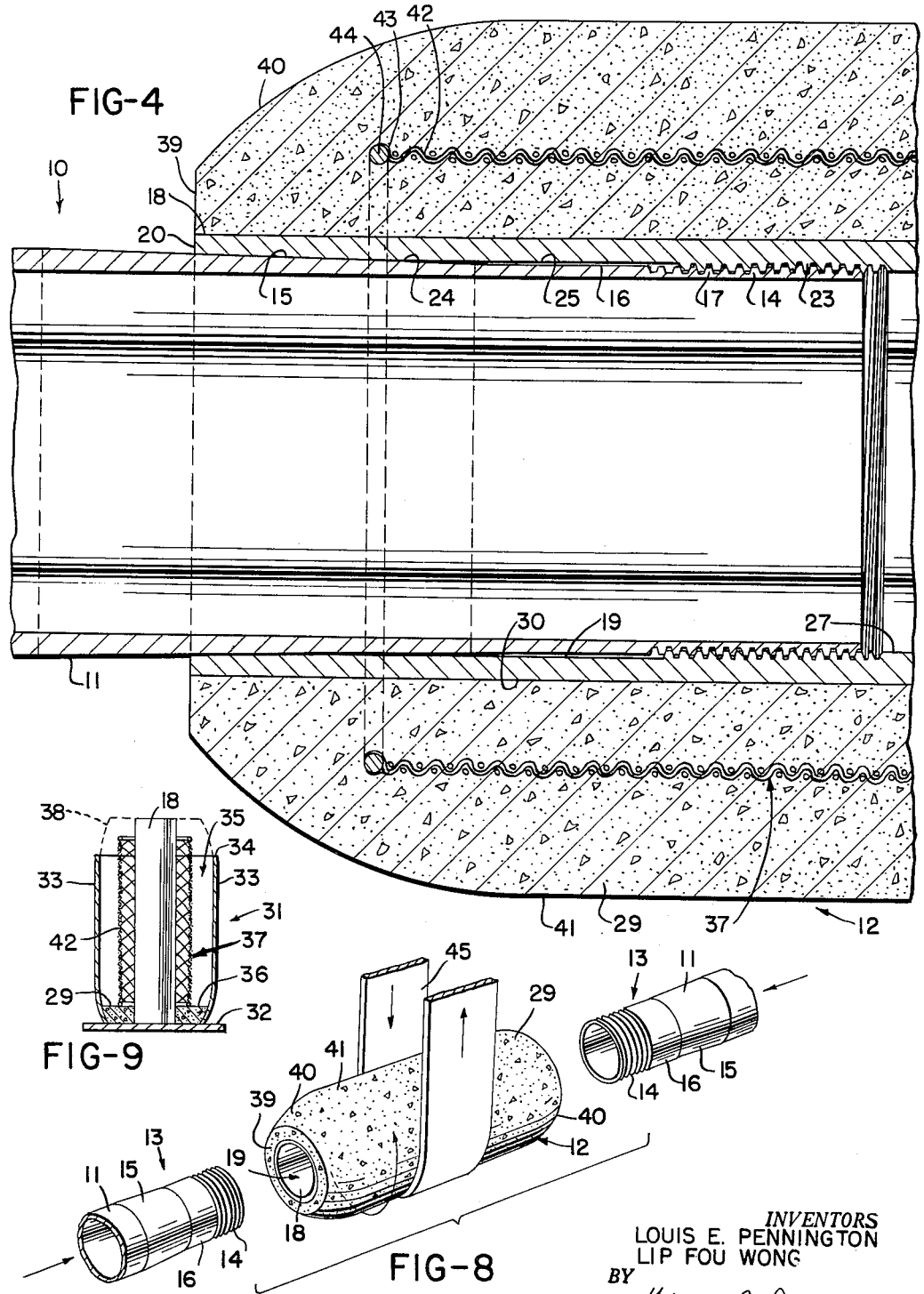

United States Patent Office 3,232,637
Patented Feb. 1, 1966

3,232,637
PIPE COUPLING
Louis E. Pennington, Chesterfield County, and Lip Fou Wong, Henrico County, Va., assignors to Reynolds Metals Company, Richmond, Va., a corporation of Delaware
Continuation of application Ser. No. 91,047, Feb. 23, 1961. This application Nov. 25, 1964, Ser. No. 416,677
6 Claims. (Cl. 285—27)

This is a continuation application of Serial No. 91,047, filed February 23, 1961, and now abandoned. This invention relates to improved conduit or pipe line constructions.

It is well known in the pipe line art that in order to lay pipes or conduits beneath bodies of water, such as lakes and the like, for transporting oil, gas, and the like across the body of water, the conduits or pipe lines are formed by coupling or otherwise securing together adjacent ends of adjacent conduit sections, and, thereafter, sinking and anchoring such interconnected conduit sections to the bottom of the body of water by attaching weights to the interconnected conduit sections.

Such conduit or pipe line constructions are normally formed of steel, whereas aluminum-containing metal is a more desirable material for such purposes, because the same is light-weight and non-corrosive. However, in the past, aluminum pipe lines took more time to install than steel pipe lines. Further, aluminum pipe lines were more frequently damaged by boat anchors dragging near the bottom of the body of water because the prior known aluminum joints were deficient in strength and easily broken by the subsequent pull exerted by the dragging boat anchor. Also, the weights attached to such aluminum pipe lines readily fell off, causing parts of the aluminum pipe line construction to float upwardly and be more susceptible to anchor grab and damage.

Accordingly, it is one of the features of this invention to provide improved structures for joining together adjacent ends of adjacent conduit sections and the like to provide improved conduit or pipe line constructions having strong joints whether the same are made of aluminum-containing metal or other material, such as steel and the like.

Another feature of this invention is to provide improved structures for weighting such conduit or pipe line constructions whether the conduits are formed of aluminum-containing metal or other material, such as steel and the like.

In particular, one conduit construction of this invention comprises a plurality of conduit sections having adjacent ends thereof coupled together by couplers or weights of this invention in such a manner that a fluid-tight seal is provided therebetween and the joints formed thereby are relatively unaffected by subsequent bending of the conduit construction resulting from boat anchor drag and the like. The couplers of this invention not only provide fluid-tight seals between the adjacent ends of adjacent pairs of conduit sections coupled thereby, but the same also weight the conduit construction to provide a negative buoyancy thereof. Since the weights of this invention provide part of the improved joints of the conduit construction, the weights cannot be readily dislodged from the conduit construction in the manner of the prior-known constructions whether the conduit sections are formed of aluminum-containing metal or other material, such as steel and the like.

Each conduit section of the above conduit construction has a pair of opposed ends respectively provided with external threaded portions and external tapering portions disposed inboard from the threaded portions and spaced therefrom by substantially cylindrical portions. The coupler of this invention includes a sleeve having a bore passing therethrough and defining an internal surface thereof, the internal surface of the sleeve or coupler having a medial threaded portion and a pair of tapering portions respectively disposed outboard of the threaded portion and spaced therefrom by a pair of cylindrical portions.

When it is desired to couple a pair of adjacent conduit sections together by a coupler of this invention, the threaded ends of the conduit sections are inserted oppositely into the bore of the sleeve of the coupler and relative rotational movement is effected therebetween whereby the threaded portions of the conduit sections are disposed in threaded relation with the threaded portion of the sleeve and tend to draw the ends of the conduit sections into the sleeve during such rotational movement. As the ends of the pair of conduit sections are progressively threaded into the coupler, the tapering portions of the conduit sections are progressively wedged into sealing relation with the tapering portions of the coupler sleeve whereby effective fluid-tight seals are provided between the adjacent conduit sections at points outboard of the threaded portion of the coupler. If one or both conduit sections should be subsequently bent relative to the coupler by boat anchor drag and the like, such bending forces are borne solely by the wedging tapering portions of the conduit sections and coupler and are not transmitted to the threaded portions thereof whereby the coupler firmly secures the conduit sections together and cannot be readily disconnected therefrom.

The coupler sleeve carries a weight means, such as concrete or the like, to provide a negative buoyancy for the conduit construction.

Therefore, the couplers of this invention not only provide improved joint structure for a conduit or pipe line construction, but the couplers also provide negative buoyancy thereof in such a manner that the weights cannot be readily dislodged therefrom as in prior known constructions whether the conduit sections are formed from aluminum-containing metal or steel.

Further, the couplers of this invention can be utilized in a simple and rapid manner to serially interconnect adjacent conduit sections together to form a conduit or pipe line construction by the methods of this invention whereby the resulting conduit construction can be formed in a more efficient and less time-consuming manner than by the prior-known butt welding methods.

Accordingly, it is an object of this invention to provide an improved conduit construction having one or more of the novel features set forth above or hereinafter shown or described.

A further object of this invention is to provide an improved coupler or weight for such a conduit construction or the like.

A further object of this invention is to provide an improved conduit section for such a conduit construction or the like.

Other objects, uses and advantages of the invention are apparent from a reading of this description, which proceeds with reference to the accompanying drawings forming a part thereof and wherein:

FIGURE 4 is an enlarged, fragmentary view of the left-hand portion of the structure illustrated in FIGURE 3.

FIGURE 8 is a fragmentary, perspective view illustrating one method of this invention for securing together adjacent ends of adjacent conduit sections by a coupler of this invention.

FIGURE 9 is a reduced cross-sectional view illustrating one method of this invention for making a coupler of this invention.

Figure 1:
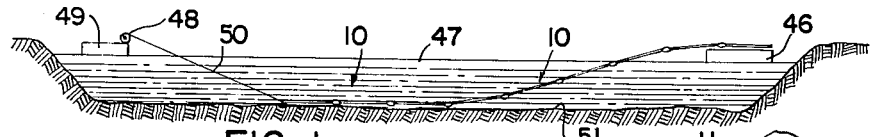
FIGURE 1 is a schematic view illustrating one method of this invention for forming a conduit construction and laying the same across the bottom of a body of water.

While the features of this invention are hereinafter described as being particularly adaptable for forming conduit or pipe line constructions formed of aluminum-containing metal, it is to be understood that the various features of this invention are equally applicable to forming conduit constructions formed of any desired material, for example, steel and the like. Therefore, this invention is not to be limited to only the application thereof illustrated in the drawings, as the drawings are merely utilized to illustrate one of the many applications of this invention.

Figure 2:
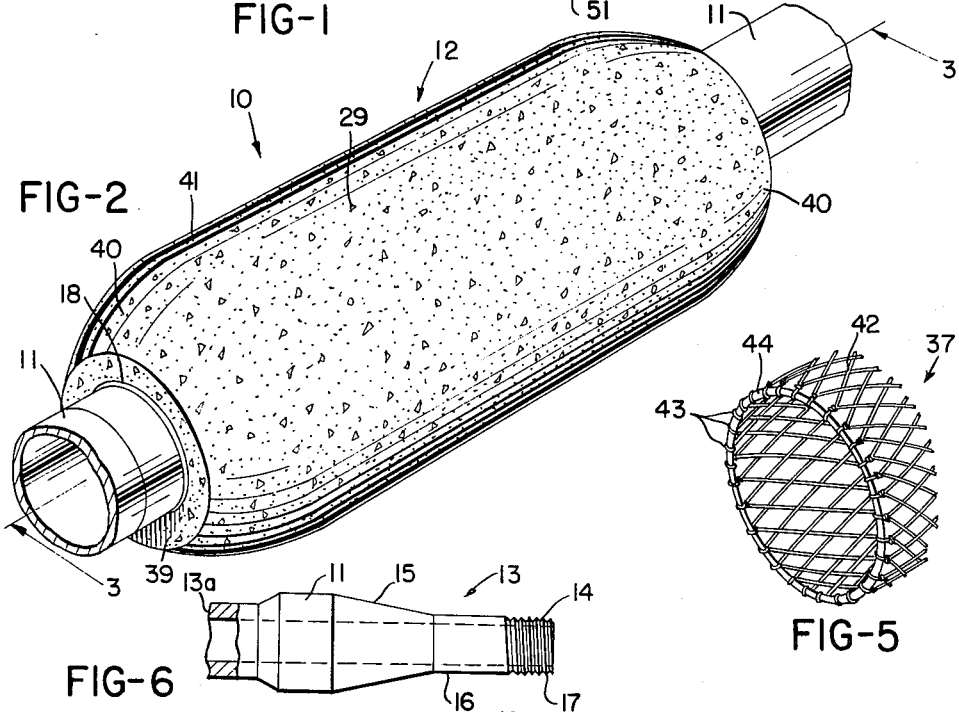
FIGURE 2 is a fragmentary, perspective view of the conduit construction of this invention and illustrates a pair of adjacent conduit sections coupled together by the methods and structures of this invention.
Figure 3:
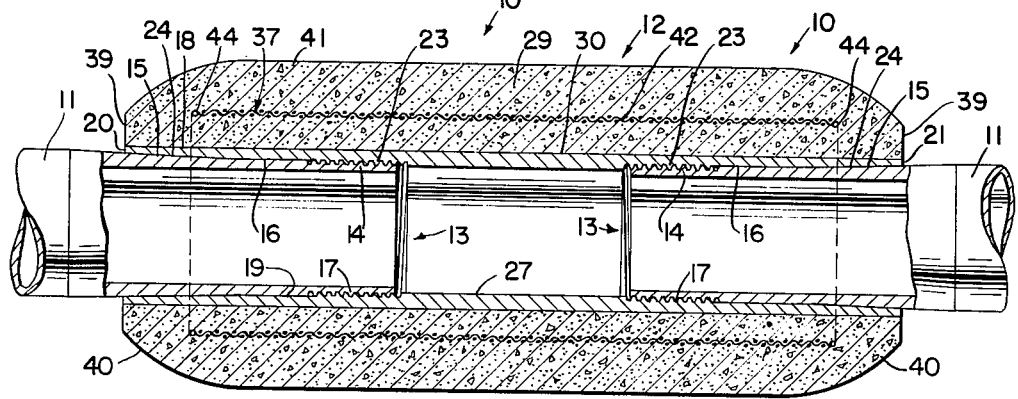
FIGURE 3 is a cross-sectional view of the structure illustrated in FIGURE 2 and is taken on line 3—3 thereof.

Referring now to FIGURES 2 and 3, an improved conduit or pipe line construction of this invention is generally indicated by the reference numeral 10 and comprises a plurality of conduit sections 11 joined together at adjacent ends thereof by a plurality of couplers or weights 12 of this invention in a manner hereinafter described, the couplers 12 not only effectively interconnecting together adjacent ends of adjacent conduit sections 11 but also providing negative buoyancy for the conduit construction 10 whereby the conduit construction 10 can be sunk and anchored to the bottom of a body of water in a manner hereinafter described.

Figure 6:
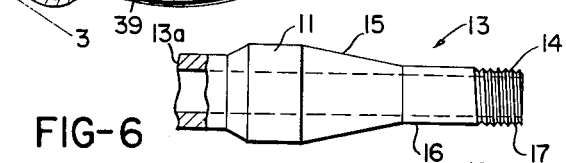
FIGURE 6 is a fragmentary view illustrating a conduit section of this invention.

Each conduit section 11 has a pair of opposed ends 13 each formed in the manner best illustrated in FIGURE 6 wherein an external, cylindrical, threaded portion 14 is disposed outboard from an external, frusto-conical or tapering portion 15 and separated therefrom by an external, substantially cylindrical portion 16.

While the conduit sections 11 can be formed of any suitable material and in any suitable manner, the embodiment thereof illustrated in the drawings comprises conventional heavy end aluminum-containing conduit sections or pipes formed of 6061–T6, 6062–T6 or 5083–H112 aluminum alloy and wherein the walls of the ends 13 thereof are thicker than the major body portion 13a of the conduit section 11 in a manner well known in the art. By providing thickened ends on the conduit sections, the thickened ends can be utilized to provide joint structures having sufficient strength characteristics whereas the design characteristics of the conduit construction do not require that the conduit sections have an overall wall thickness equal to the wall thickness of the ends thereof. Therefore, by utilizing heavy end conduit sections, a saving of approximately 27% in piping material is realized over conventional uniform wall thickness piping.

For example, standard heavy end conduit sections known as "four-inch pipes" each has an outside diameter at the ends 13 thereof of approximately 4.572 inches, with a wall thickness at the ends 13 of approximately .0258 of an inch to provide an inside diameter at the ends 13 of approximately 4.026 inches. The overall length of such conduit sections 11 are approximately 40 feet with the heavy ends 13 having lengths of approximately 11 inches. The major body portion 13a of the conduit section 11 disposed inboard of the heavy ends 13 thereof have an outside diameter of approximately 4.176 inches, with a wall thickness of approximately 0.150 of and inch to provide an internal diameter of approximately 3.876 inches.

When such aluminum-containing, heavy end piping is utilized to form the conduit sections 11 of this invention, the heavy ends thereof are cut down in the manner illustrated in FIGURE 6 to provide the afore-mentioned threaded portions 14, tapering portions 15 and cylindrical portions 16. The lengths of the threaded portions 14 of the four-inch conduit sections 11 are approximately 2.500 inches, with the lengths of the cylindrical portions 16 thereof being approximately 2.000 inches. The length of the frusto-conical or tapering portions 15 are approximately 5.000 inches and has a taper runout of approximately 0.018 of an inch per inch thereof, i.e., the outside diameter of each tapering portion 15 decreases from the larger end thereof to the smaller end thereof at a rate of approximately 0.036 of an inch per inch length thereof.

Therefore, the outside diameter of such a four-inch heavy end conduit section 11 at the beginning of each taper or seal zone 15 thereof is approximately 4.572 inches and the outside diameter at the smaller end of each tapering portion 15, cylindrical portion 16 and threaded zone 14 is approximately 4.392 inches. The threaded zone 14 of each end 13 of the four-inch conduit sections 11 is provided with American Standard 29° stub threads 17 having a height of approximately 0.060 of an inch and six threads per inch thereof, with a pitch diameter of approximately 4.332 inches.

It should be understood that the afore-mentioned alloys and dimensions for the conduit sections 11 are merely illustrative of one embodiment of this invention that has proved satisfactory and that any standard or other conduit sections of other materials can be utilized to form the conduit sections 11, if desired. For example, steel conduit sections having a uniform wall thickness throughout their lengths can be utilized by merely machining the ends thereof to provide the above-mentioned tapering, cylindrical and threaded portions.

Figure 7:
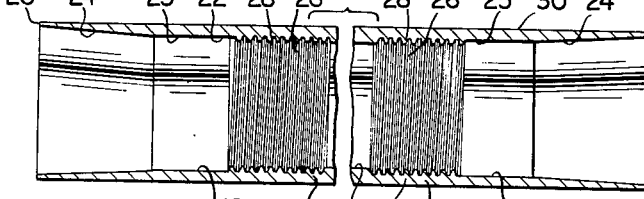
FIGURE 7 is a cross-sectional view illustrating the sleeve of the coupler or weight of this invention.

Each weight or coupler 12 of this invention, FIGURE 7, includes a sleeve 18 formed of any suitable material, such as an aluminum-containing metal or the like, and has a bore 19 interrupting the opposed ends 20 and 21 thereof and passing axially therethrough. The bore 19 defines an internal peripheral surface 22 of the sleeve 18. The internal surface 22 of the sleeve 18 has an internal threaded portion 23 disposed substantially medially between the ends 20 and 21 thereof and a pair of internal tapering portions 24 disposed outboard of the threaded portion 23 and separated therefrom by internal, substantially cylindrical portions 25.

When the sleeves 18 of the couplers 12 are utilized to couple together conduit sections 11 formed of the afore-mentioned four-inch piping having the dimensions specified above, the overall length of each sleeve 18 is approximately 24 inches, having an outside diameter of approximately 5.065 inches. The threaded portion 23 thereof is approximately 13 inches long and comprises a pair of counter-threaded sections 26 separated by a substantially cylindrical spacing section 27, each threaded section 26 being approximately 2.500 inches long and formed of American Standard 29° stub threads 28 in a manner similar to the threads 17 of the conduit sections 11. The free ends of the threads 28 define an internal diameter of the sleeve 18 of approximately 4.292 inches and have a height of approximately 0.060 of an inch to provide a pitch diameter of approximately 4.357 inches. There are six threads 28 per inch of length of the threaded sections 26.

The cylindrical portions 25 of the sleeve 18 are approximately 2.5 to 3 inches long and define an internal diameter of the sleeve 18 of approximately 4.427 inches.

The frusto-conical or tapering portions 24 of the sleeve 18 are each approximately 2.5 to 3 inches long and decrease the internal diameter of the sleeve 18 from the respective end 20 or 21 thereof to the cylindrical portion 25 thereof at a rate of approximately 0.036 of an inch per inch length thereof, whereby the internal diameter at the ends 20 and 21 of the sleeve 18 is approximately 4.500 inches.

The sleeve 18 can be made with any suitable wall thickness and can be formed in any suitable manner. For example, the sleeve 18 can be cut from a length of hollow extruded 6061-T6 aluminum alloy and have the inside portions 23, 24 and 25 thereof appropriately machined in a manner well known in the art. Alternately, such sleeve 18 could be cast in the form illustrated in FIGURE 7 in a manner well known in the art.

Each coupler 12 is formed from a sleeve 18 by casting or otherwise securing suitable weight material 29 around the outer peripheral surface 30 thereof. For example, the weight material 29 can be a high density, heavy aggregate grout, such as Barite or the like, having a density of 205-215 pounds per cubic foot thereof. The outer peripheral surface 30 of each sleeve 18 can be roughened in a manner well known in the art to enhance the securing effect of the weight material 29 to the sleeve 18. However, since the typical shear bond between concrete and an unroughened aluminum surface is in the order of 80 p.s.i., the area of bond between the concrete 29 and 24 inch aluminum sleeve 18 is in the order of 380 square inches whereby the concrete shear bond on the smooth aluminum surface 30 of the sleeve 18 is in the order of 30,500 pounds, or in excess of fifteen tons of shear bond which is adequate for weight retention.

While the concrete weight material 29 can be cast to the sleeve 18 in any suitable manner, one method is illustrated in FIGURE 9 and includes a mold apparatus 31 having a base member 32 and side walls 33 interconnected thereto and defining an open end 34 of a mold chamber or cavity 35. The sleeve 18 is placed vertically in the central portion of the mold chamber 35 with one of the ends thereof resting on the base means 32. Thereafter, a small quantity of weight material 29 is poured into the cavity 35 to the level 36. Thereafter, a cylindrical reinforcing member 37 is telescoped around the sleeve 18 and has one of the ends thereof resting on the top surface 36 of the small quantity of casting material 29 disposed in the cavity 35. Subsequently, the remainder of the cavity 35 is filled with the weight material 29 to the position illustrated by dotted lines 38 whereby the reinforcing member 37 is fully embedded and cast within the concrete material 29 with the weight material 29 being cast around the sleeve 18. The concrete material 29 extending beyond the upper open end 34 of the side wall means 33 of the mold device 31 can be smoothed by troweling or the like to form a symmetrical end in the manner similar to the other end thereof formed by the particular configuration of the mold chamber 35. In particular, the resulting cast weight material 29 has a flat annular end 39, FIGURE 4, and an arcuate surface 40 disposed angularly thereto and feathering into the substantially cylindrical portion 41 of the coupler 12.

When the weight material 29 is cast to a sleeve 18 to be utilized with the afore-mentioned four-inch conduit sections 11, the weight material 29 defines an outer diameter of the coupler 12 at the cylindrical surface 41 thereof of approximately 10 inches with the flat annular ends 39 thereof having widths of approximately ¾ of an inch and with the arcuate surfaces 40 thereof being defined by 5 inch radii generated about points disposed inboard of the flat ends 39 a distance of approximately 3.750 inches. Since it has been found that a dry weight of 165 pounds must be provided for each forty-foot length of the afore-mentioned four-inch heavy end aluminum conduit sections 11 to provide a 5% negative buoyancy for the evacuated conduit construction 10, the weight material 29 for each sleeve 12 must weigh at least 165 pounds. However, if the couplers 12 do not weigh 165 pounds, additional weights can be attached to the conduit construction 10 to provide the desired degree of negative buoyancy and this invention is not to be limited to any particular weight as the length of the conduit sections 11 can vary as desired.

Figure 5:
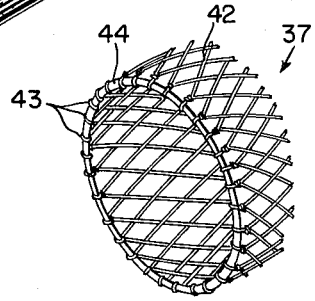
FIGURE 5 is a fragmentary, perspective view illustrating the reinforcing means of this invention.

The cylindrical reinforcement 37 for the concrete portion 29 of each coupler 12 can be formed in any desired manner. One embodiment thereof is illustrated in FIGURE 5 and comprises a two-inch by #10 gauge steel reinforcing mesh 42 arranged in cylindrical form and having the free ends 43 of the individual wires of the mesh 42 looped about reinforcing rings 44 disposed at the ends of the cylindrical mesh 42 to hold the mesh 42 in cylindrical form and provide maximum reinforcing means at the ends of the concrete weight material 29. The reinforcing rings 44 can be formed in any suitable manner and can comprise, for example, ¼ inch aluminum or steel rods bent into ring shape.

When the weight material 29 is cast around the sleeve 18 and the telescoping reinforcement 37, it is preferred that the reinforcement 37 be located at a minimum of 1½ inches below the outside surface of the cast weight material 29 and preferably disposed 2 inches inboard of the ends 39 thereof.

After the coupler 12 has been formed in the above manner, or in any other suitable manner, and has been removed from the molding device 31, the coupler 12 is adapted to couple together two adjacent conduit sections 11 in the following manner:

As illustrated in FIGURE 8, the adjacent ends 13 of adjacent conduit sections 11 are oppositely inserted into the bore 19 of the coupler 12, and, by either rotating the coupler 12 relative to the conduit sections 11, or the conduit sections 11 relative to the coupler 12, the threaded portions 14 of the conduit section 11 make threaded engagement with the respective threaded sections 26 of the threaded portion 23 of the sleeve 18 and cause the ends 13 of the conduit sections 11 to be progressively drawn within the bore 19 of the sleeve 18. Since the internal diameter of the cylindrical portions 25 of the sleeve 18 is slightly larger than the external diameter of the threads 17 of the conduit sections 11, the conduit sections 11 are centralized and stabilized in proper relationship to the threaded portion 23 of the sleeve 18 by the cylindrical portions 25 of the sleeve 18 before threaded engagement begins. Inward movement of the conduits 11 relative to the coupler 12 through the threading relation thereof is continued until the tapering portions 15 of the conduit sections 11 respectively make wedging contact with the tapering portions 24 of the sleeve 18, whereby an effective seal is created between the sleeve 18 and the conduit sections 11 to fluidly interconnect the conduits 11 together in the manner illustrated in FIGURES 3 and 4.

One method for effecting such a coupling operation is to loop a continuous belt 45, FIGURE 8, about the coupler 12 and continuously move the belt in a particular direction to rotate the coupler 12 in the proper direction relative to the conduit sections 11 to effectively interconnect the conduit sections 11 together when the conduits 11 are inserted into the rotating coupler 12. For the afore-mentioned four-inch conduit sections 11 and coupler 12, it is desired that the same be torqued by the belt 45 in the range of 800 to 1,000 foot pounds to effectively provide a fluid-tight seal between the tapering portions 15 of the conduit sections 11 and the tapering portions 24 of the sleeves 18, the threaded relation of the threaded portions 14 of the conduit sections 11 with the threaded portion 23 of the sleeve 18 holding the tapering portions 15 and 24 in this fluid tight relation.

In order to perfect the fluid-tight seal between the tapering surfaces 15 of the conduit sections 11 and tapering surfaces 24 of the coupler 12, a suitable sealing compound can be placed on the tapering portions 15 of the conduit sections 11 by a spatula or the like before the same are inserted into the coupler 12 to fully insure a fluid-tight seal against the tapering surfaces 24 of the sleeve 18. While any suitable sealing compound can be utilized, one such compound that has been proved satisfactory is U.S. Stoneware's No. TW 36M Underwater Curing Epoxy Resin Compound, manufactured by U.S. Stoneware Corporation, Akron, Ohio.

Also, a similar compound can be placed on the threads 17 of the threaded portions 14 of the conduit sections 11 before the same are inserted into the coupler 12 to provide thread lubrication and prevent galling and seizure of the threads 17 and 28 during torque-up and further to provide supplemental sealing of the conduit sections 11 to the coupler 12. Such sealing compound on the threads 17 and 28 also tends to prevent rotational movement of the coupler 12 relative to the conduit sections 11 after the sealing compound has set and hardened with the coupler 12 placed in the proper torque-up relation with the conduit sections 11.

In addition, the cylindrical surfaces 16 of the conduit sections 11 can be coated with such compound to provide lubricating and sealing means therefor.

Because the threaded sections 26 of the sleeve 18 are disposed inboard of the ends 20 and 21 thereof, a blind-stab is effected between threaded portions 14 of the conduit sections 11 and the threaded sections 26 of the sleeve 18 when the conduit sections 11 are initially inserted into the bore 19 of the sleeve 18. However, since the threaded relation between the threads 17 and 28 is relatively a loose fit ranging from approximately 0.002 to 0.022 of an inch, cross-threading is prevented during the coupling operation.

While a plurality of conduit sections 11 can be interconnected together in aligned relation by the couplers 12 in any desired manner and sequence to form the conduit construction 10, one such method is illustrated in FIGURE 1. In particular, a conduit forming and laying barge 46 or the like is anchored on a body of water 47 at one terminal point of the conduit construction 10 and is utilized to continuously interconnect adjacent ends of adjacent conduit sections 11 together with the couplers 12 whereby the resulting conduit construction 10 formed thereby is continuously drawn therefrom by a suitable winch 48 or the like carried by a barge 49 anchored at the other terminal point of the conduit construction 10 and interconnected thereto by the chain or pulling means 50. In this manner, the conduit construction 10 is continuously dragged across the bottom 51 of the body of water 47 as the conduit construction 10 is being continuously formed from the conduit sections 11 and couplers 12 without time consuming welding operation, the couplers 12 providing a negative buoyancy for the conduit construction 10 and causing the same to sink to the bottom 51 of the body of water 47.

Since the weight portions 29 of the couplers 12 are streamlined, by the arcuate portions 40 thereof in the manner previously described, the weights 12 are adapted to be dragged across the bottom 51 of the body of water 47 without spalling or cracking the concrete 29 to an adverse degree.

Alternately, various lengths of the conduit construction 10 can be formed on land and subsequently towed out into the body of water 47 and interconnected together to form the conduit construction across the body of water 47.

Therefore, it can be seen that there is provided improved structures for forming a conduit construction wherein adjacent conduit sections are interconnected together in an effective and efficient manner and are weighted to provide a negative buoyancy thereof.

Should the interconnected conduit sections 11 of the conduit construction 10 be subsequently bent relative to the couplers 12 by boat anchor drag and the like, such bending force will not reach the threaded connections 14 and 26 thereof, because the tapering portions 15 of conduit sections 11 are disposed in intimate contact with the tapering portions 24 of the sleeve 18 and bear the entire force of such bending action whereby such bending forces do not reach the threaded connections of the couplers 12 and conduit sections 11 to damage or loosen the joint structures thereof.

In particular, a test was performed in a bending jig wherein two 40-foot lengths of four-inch, heavy end conduit sections 11 of aluminum alloy 6061–T6 were coupled together by a coupler 12. The coupler 12 was located midway between a pair of hold-down rollers of the bending jig and disposed approximately 40 feet apart. The jointed pipe was then deflected upwardly by a chainfall located directly over the concrete weighted coupler 12 until failure occurred. Throughout a number of such specimens tested failure invariably occurred in buckling of the aluminum pipe rather than in the threaded connection of the coupler 12 and thereby indicating that in any bending action on the conduit construction 10 the joints 12 exceeded 100% efficiency.

Further, a 300-foot long conduit construction 10 was tested against a similar 300-foot length of butt-welded steel pipe. The two conduit constructions were picked up simultaneously at their mid-points on a spreader bar of individual cable drops to the two pipe strings. In the steel conduit construction failure occurred through the breakage of the butt weld between adjacent conduit sections at an elevation of 56 feet, whereas failure occurred only in the conduit sections of the aluminum conduit construction 10 of this invention at an elevation of 60 feet.

In a direct-tension test on the aluminum four-inch conduit construction 10 of this invention, failure occurred only in the pipe portion of the specimen tested at 143,000 pounds tensile load.

Thus, the strength of the joints provided by the couplers 12 is stronger than that provided by the actual body of the conduit sections 11 whether the conduit construction 10 is subject to a bending force or a direct tension force.

Also, since the weight material 29 that provides for negative buoyancy of the conduit construction 10 is an integral part of the couplers 12, the weights of the conduit construction 10 cannot be dislodged therefrom as in the prior-known conduit or pipe line constructions whether the conduit construction is formed of aluminum-containing metal or other material, such as steel and the like.

In a pressure test of the couplers 12 for a conduit construction 10 formed of the afore-mentioned four-inch heavy end aluminum alloy 6061–T6 conduit sections 11, the conduit construction 10 held 1600 p.s.i.g. test pressure for seventy-five hours without any evidence of pressure drop. However, since at a safety factor of 3, the recommended working pressure for a four-inch heavy end conduit section 11 of 6061–T6 aluminum alloy is 1295 p.s.i.g., the test pressure exceeded the maximum working pressure by a factor of 125%. Thus, the sealing effect provided between the tapering portions 15 of the conduit sections 11 and the tapering portions 24 of the couplers 12 holds pressures far in excess of the recommended pressures for the conduit sections 11 by themselves.

Therefore, it can be seen that this invention provides improved conduit construction having means effectively coupling together adjacent conduit sections as well as providing negative buoyancy thereof. There is also provided improved methods for making such a conduit construction or the like. In addition, this invention provides improved coupling devices as well as improved method of making such coupling devices or the like.

What is claimed is:

1. In combination, a pair of conduit sections each having an end, each end of said conduit sections having an external threaded portion and an external tapering portion disposed inboard of said threaded portion thereof and being spaced therefrom by a cylindrical portion, each said tapering portion having a length at least twice as long as the length of its respective threaded portion, and a coupler having a bore passing therethrough and defining an internal surface of said coupler, said internal surface of said coupler having a threaded portion and a pair of tapering portions respectively disposed outboard of said threaded portion thereof and spaced therefrom by cylindrical portions, each tapering portion of said conduit sections being longer than each said tapering portion of said coupler and having a maximum diameter larger than the maximum diameter of each said tapering portion of said coupler, each said cylindrical portion of said coupler having a length greater than the length of the cylindrical portion of a respective conduit section, said threaded portion of said coupler being divided into two threaded sections by an intermediate unthreaded section whereby each threaded section is approximately the same length as the length of said threaded portion of a respective conduit section, said tapering portions and cylindrical portions of said coupler each having a length at least as long as the length of each threaded section and each threaded portion of said conduit sections, said bore oppositely receiving said ends of said conduit sections in a blind stab relationship with said tapering portions of said conduit sections respectively disposed in wedged relation with said tapering portions of said coupler throughout the entire length of said tapering portions of said coupler and with said threaded portions of said conduit sections respectively disposed in threaded relation with said threaded portion of said coupler to interconnect said conduit sections together whereby said cylindrical portions of said coupler align said conduit sections therewith before said threaded portions are disposed in threaded relation.

2. A combination as set forth in claim 1 wherein weight means are carried by said coupler to provide negative buoyancy of said combination.

3. A combination as set forth in claim 2 wherein said weight means comprise cement and wherein a cylindrical reinforcing sleeve encompasses said coupler and is embedded in said cement.

4. A combination as set forth in claim 1 wherein a sealant is compressed between said pairs of wedged tapering portions of said conduit sections and said coupler.

5. A combination as set forth in claim 1 wherein a sealant is disposed between said threaded portions of said conduit sections and said coupler.

6. A combination as set forth in claim 1 wherein the lengths in like units for said conduit sections and said coupler are such that each said threaded section is 2.5 units; each cylindrical portion of said coupler is between 2.5 and 3.0 units; each tapering portion of said coupler is between 2.5 and 3.0 units; each threaded portion of said conduit sections is 2.5 units; each cylindrical portion of sand conduit section is 2.0 units; and each tapering portion of said conduit section is 5.0 units.

References Cited by the Examiner

UNITED STATES PATENTS

| | | | |
|---|---|---|---|
| 318,925 | 5/1885 | Patterson | 285—45 |
| 410,816 | 9/1889 | Walker et al. | 285—294 X |
| 468,269 | 2/1892 | Stempel | 138—175 |
| 607,018 | 7/1898 | Connelly | 285—45 X |
| 1,637,628 | 8/1927 | Weisgerber | 285—27 |
| 1,960,249 | 5/1934 | Mano | 285—45 X |
| 2,498,831 | 2/1950 | Veitch | 285—292 X |
| 2,518,981 | 8/1950 | Edwards | 138—178 |
| 2,574,081 | 11/1951 | Abegg | 285—334 X |
| 2,662,552 | 12/1953 | Rowe et al. | 138—178 |
| 2,907,589 | 10/1959 | Knox | 285—332.2 X |
| 3,059,697 | 10/1962 | Pitts | 285—292 X |
| 3,126,214 | 3/1964 | Wong et al. | 285—33 X |

FOREIGN PATENTS 24,518   9/1901   Switzerland.

CARL W. TOMLIN, *Primary Examiner.*

THOMAS F. CALLAGHAN, *Examiner.*